(12) United States Patent
Takahashi

(10) Patent No.: US 7,158,884 B2
(45) Date of Patent: *Jan. 2, 2007

(54) SADDLE-TYPE VEHICLE EQUIPPED WITH A NAVIGATION SYSTEM

(75) Inventor: Shinji Takahashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/113,276

(22) Filed: Apr. 25, 2005

(65) Prior Publication Data

US 2005/0200519 A1 Sep. 15, 2005

Related U.S. Application Data

(63) Continuation of application No. 10/650,985, filed on Aug. 29, 2003.

(30) Foreign Application Priority Data

Sep. 11, 2002 (JP) ............... 2002-265661

(51) Int. Cl.
  *H01Q 1/22* (2006.01)
  *H01Q 1/32* (2006.01)
  *B62J 11/00* (2006.01)
  *G01C 21/26* (2006.01)

(52) U.S. Cl. ............. 701/213; 343/711; 224/413; 280/288.4; 248/214; 248/229.1

(58) Field of Classification Search ............... None
  See application file for complete search history.

(56) References Cited

U.S. PATENT DOCUMENTS

| | | | | |
|---|---|---|---|---|
| 2,168,939 A | * | 8/1939 | Kraeft | 74/551.8 |
| 4,687,072 A | * | 8/1987 | Komuro | 180/219 |
| 5,144,318 A | * | 9/1992 | Kishi | 342/357.15 |
| 5,248,981 A | * | 9/1993 | Yoshihara et al. | 342/357.15 |
| 6,125,782 A | * | 10/2000 | Takashima et al. | 114/343 |
| 6,157,297 A | * | 12/2000 | Nakai | 340/461 |
| 6,249,744 B1 | | 6/2001 | Morita | |
| 6,305,241 B1 | * | 10/2001 | Masui et al. | 74/551.8 |
| 6,561,400 B1 | | 5/2003 | Lee | |
| 6,581,709 B1 | * | 6/2003 | Tsuji | 180/90 |
| 6,783,040 B1 | | 8/2004 | Batchelor | |
| 6,876,924 B1 | * | 4/2005 | Morita et al. | 701/211 |
| 2002/0113185 A1 | * | 8/2002 | Ziegler | 248/309.1 |
| 2002/0177949 A1 | * | 11/2002 | Katayama et al. | 701/211 |

FOREIGN PATENT DOCUMENTS

DE    19947506 A1  * 10/1999

(Continued)

OTHER PUBLICATIONS

"IDC GPS Motorcycle Mounts" All-OffRoad—Hardware Reviews, pp. 1-3 (Feb. 2002).

(Continued)

*Primary Examiner*—Gregory C. Issing
(74) *Attorney, Agent, or Firm*—Birch, Stewart, Kolasch & Birch, LLP

(57) ABSTRACT

A GPS antenna is arranged such that it can easily receive satellite radio waves. An ATV vehicle equipped with a navigation system for measuring the position of the vehicle by receiving radio waves from an artificial satellite. A meter box is mounted to a steering handle of the ATV vehicle, and a GPS unit and a GPS antenna mounted inside the meter box. A second GPS antenna is mounted to a rear fender to enable diversity of reception.

15 Claims, 3 Drawing Sheets

FOREIGN PATENT DOCUMENTS

| | | | |
|---|---|---|---|
| EP | 1 143 259 | A2 | 10/2001 |
| EP | 1143259 | * | 10/2001 |
| JP | 09095276 | A | 4/1994 |
| JP | 09121108 | A * | 5/1997 |
| WO | WO 00/17957 | A1 | 3/2000 |

OTHER PUBLICATIONS

"Innovative Design Concepts Custom GPS Mount" ExtremeBuggies.com, Jim Suty, pp. 1-3 (Jul. 2000).

"About IDC" Innovative Design Concepts, pp. 1-7 (Nov. 2004).

* cited by examiner

SADDLE-TYPE VEHICLE EQUIPPED WITH A NAVIGATION SYSTEM

CROSS-REFERENCE TO RELATED APPLICATIONS

The present application is a Continuation of application Ser. No. 10/650,985 filed on Aug. 29, 2003, and claims priority under 35 USC 119 to Japanese Patent Application Nos. 2002-265661 filed on Sep. 11, 2002 the entire contents thereof are hereby incorporated by reference.

BACKGROUND OF THE INVENTION

1. Field of the Invention

The present invention relates to a saddle-type vehicle equipped with a navigation system and, particularly, to a saddle-type vehicle equipped with a navigation system, which comprises a GPS receiver suitable for receiving data from a satellite with high sensitivity.

2. Description of Background Art

A navigation system is widely used which uses a combination of a global positioning system for measuring the location of a mobile station making use of radio waves transmitted from an artificial satellite and map information to display the current location of a vehicle on a map and navigates a user to his/her destination.

In this navigation system, care must be taken for the arrangement of a sensor (GPS antenna) for receiving radio waves from an artificial satellite in order to prevent a reception failure which occurs when the sensor is hidden behind a movable member such as the steering handle of a vehicle or a driver. For example, Japanese Laid-open Patent Application No. 9-95276 discloses a motorcycle equipped with a GPS antenna which is arranged before the moving locus of the handlebar in a forward direction of the vehicle.

Since the GPS antenna is arranged in front of the steering handle in the above prior art device, radio waves coming from a forward direction in front of the steering handle are not cut off by the steering handle. However, the height of the GPS antenna is not taken into full consideration. For instance, in an ATV, a carrier may be placed in front of the steering handle. Therefore, the GPS antenna is hidden behind baggage placed on the carrier in this case.

SUMMARY AND OBJECTS OF THE INVENTION

It is an object of the present invention to solve the above problem of the prior art by providing a saddle-type vehicle equipped with a navigation system that includes a GPS receiver and takes into consideration the arrangement of a GPS antenna in order to prevent radio waves from a satellite from being cut off by things other than the steering handle.

To attain the above object, the first feature of the present invention is the provision of a saddle-type vehicle equipped with a navigation system for measuring the vehicle's location by receiving radio waves from an artificial satellite that includes a meter box mounted to a front portion of the body, a GPS unit mounted in an upper portion of the meter box and a GPS antenna mounted on the top of the GPS unit.

According to the first feature, since the GPS antenna is mounted on the top of the meter box installed at a relatively high position on the vehicle so that a driver can easily see it, satellite radio waves can be received at a wide range.

The second feature of the present invention is that the vehicle further comprises a pole extending upward from a fender covering wheels and a second GPS antenna mounted to the top of the pole so that diversity reception is made possible with the GPS antenna of the GPS unit.

According to the second feature, the diversity of reception of radio waves from the satellite is made possible with high sensitivity by using two GPS antennas installed at high positions on the body.

The third feature of the present invention is that a carrier for mounting baggage is provided in the front and rear of the body. According to the third feature, even when baggage is placed on the carriers installed at the front and rear of the body and a front view is taken into consideration, the height of the baggage does not become too large, thereby making it possible to easily receive satellite radio waves with the GPS antenna installed at a relatively high position of the body.

Further, the fourth feature of the present invention is that the above meter box comprises the GPS unit, an indicator for indicating position information supplied from the GPS unit and a cover for covering the GPS unit and the indicator.

According to the fourth feature of the present invention, since the GPS unit and the indicator are arranged in proximity to each other and covered with the same cover, harnesses for interconnecting the GPS unit and the indicator can be shortened, the production becomes easy and the appearance of the vehicle becomes good.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
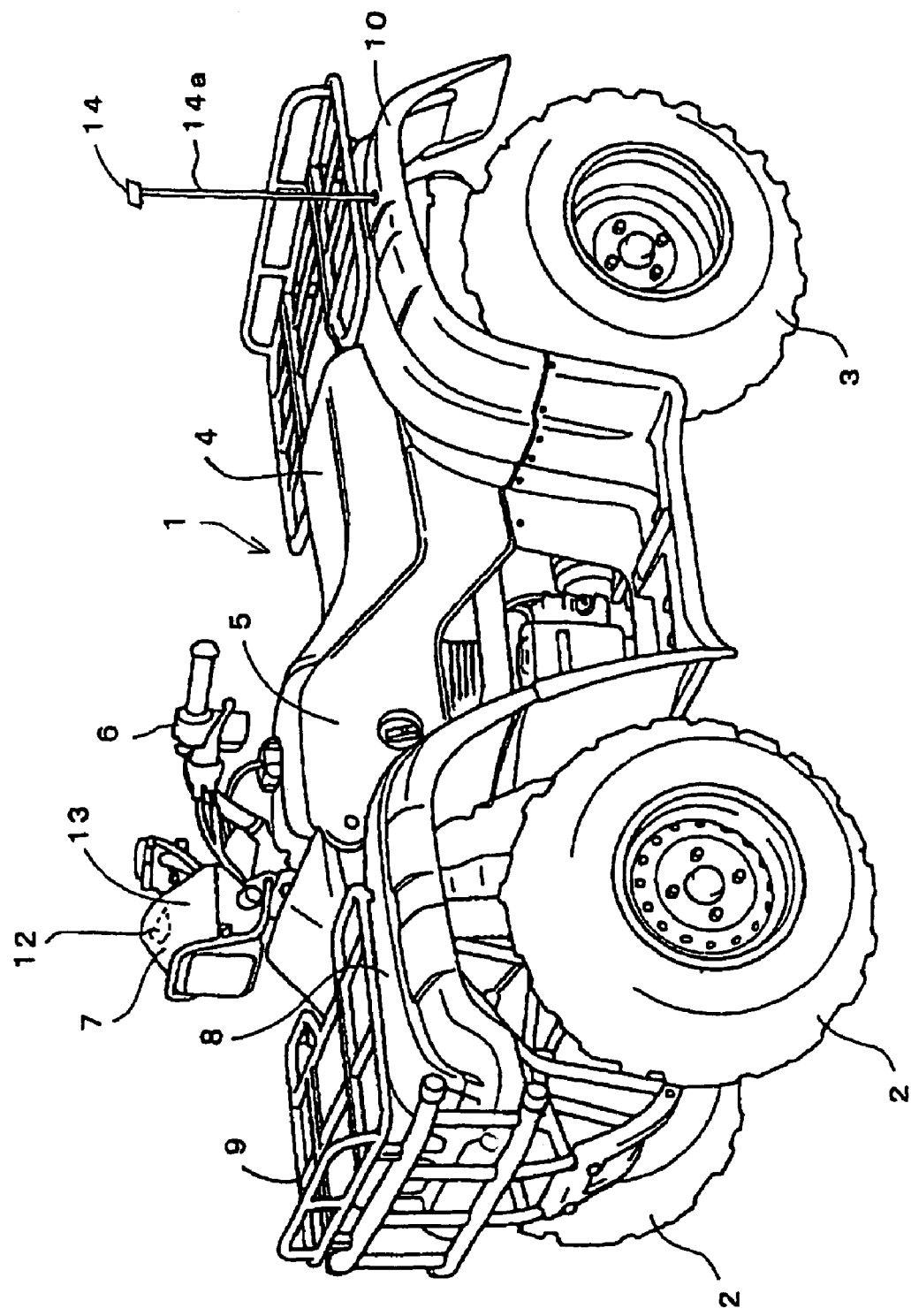
FIG. 1 is a perspective view of a saddle-type vehicle equipped with a navigation system according to the present invention.

The present invention will be described in detail hereinbelow with reference to the accompanying drawings. FIG. 1 is a perspective view of an ATV 1 as a vehicle equipped with a GPS receiver according to an embodiment of the present invention. ATV 1 has a seat 4 situated between front wheels 2 and rear wheels 3 having balloon tires and a fuel tank 5 located in front of the seat 4. A steering handle 6 and a meter box 7 installed at the center of the steering handle 6, and a section in front of the steering handle 6 is covered with a front fender 8 are provided in front of the fuel tank 5. A front carrier 9 for mounting baggage is provided on the top of the front fender 8. On the rear wheel 3 side, there are provided a rear fender 10 and a rear carrier 11. An engine and a four wheel drive unit for transmitting the power of the engine to the front wheels 2 and the rear wheels 3 are arranged below the seat 4.

The GPS receiver and a GPS antenna 12 for a navigation system which will be described in detail hereinafter are installed in the meter box 7. Particularly, the GPS antenna 12 is arranged at the highest position of the meter box 7. That is, in ATV 1, as illustrated in the FIG. 1, the meter box 7 is situated at the highest position of the vehicle, and the GPS antenna 12 is located at the highest position of the meter box 7. This is aimed to receive satellite radio waves with high sensitivity. The meter box 7 is covered with a cover 13.

The satellite radio waves are mainly received by the GPS antenna 12 installed in the meter box 7. A second GPS antenna 14 may be mounted on the rear fender 10 or the like. This makes possible diversity of reception that the satellite radio waves can be received better. It is recommended to mount the second GPS antenna 14 to the distal end of a pole 14a set in the rear fender 10 so that radio waves can be received at a higher position. The GPS antenna 14 may be mounted to not only on the rear fender 10 but also any one of the fenders covering the four wheels.

Figure 2:
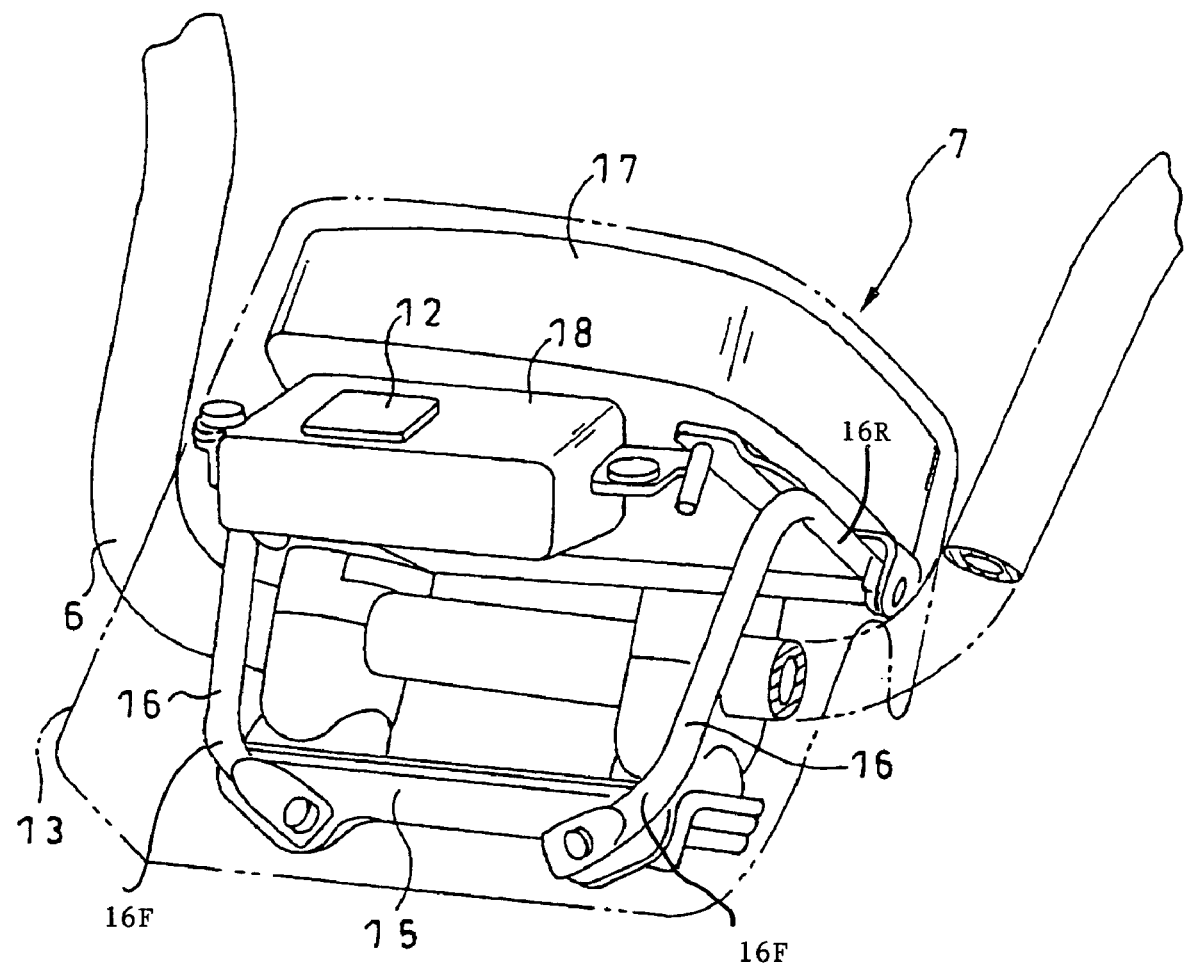
FIG. 2 is a perspective view of a meter box including a navigation system mounted to the vehicle of FIG. 1.

FIG. 2 is an exploded perspective view of the meter box 7 when seen from the front of the vehicle. In FIG. 2, the meter box 7 has frames 16 fixed to the support member 15 of the steering handle 6, and an indicator 17 and a GPS unit 18 are held to the frames 16. As can be seen, support member 15 extend laterally and is disposed in a position forwardly and downwardly with respect to the central portion of steering handle 6. Frames 16 are a pair of L-shaped frames 16, 16 connected at forward ends 16F thereof to opposite ends of the support member 15, and connected at rear ends 16R thereof to an underside of the indicator 17, thereby mounting the meter box 7 to the steering handle 6 of the vehicle 1. The indicator 17 is arranged such that its screen is opposite to a driver so that he/she can easily see it. The GPS unit 18 is arranged before the indicator 17 in a forward direction of the vehicle, and the GPS antenna 12 is situated almost at the same height as the upper end of the indicator 17. The GPS unit 18 calculates position information based on satellite radio waves received by the GPS antenna 12 and the running distance and direction of the vehicle. FIG. 2 also illustrates cover 13 extending downwardly over a central portion of the steering handle 6 so as to cover a top side of the indicator 17, the central portion of the steering handle 6, the pair of frames 16, 16, and the support member 15.

The indicator 17 has a display panel for displaying information on the driving states of ATV 1 such as the speed of the vehicle and the exchange time of engine oil and information on the location of the vehicle based on satellite radio waves received by the GPS unit 18. The position information can be displayed together with a map.

Figure 3:
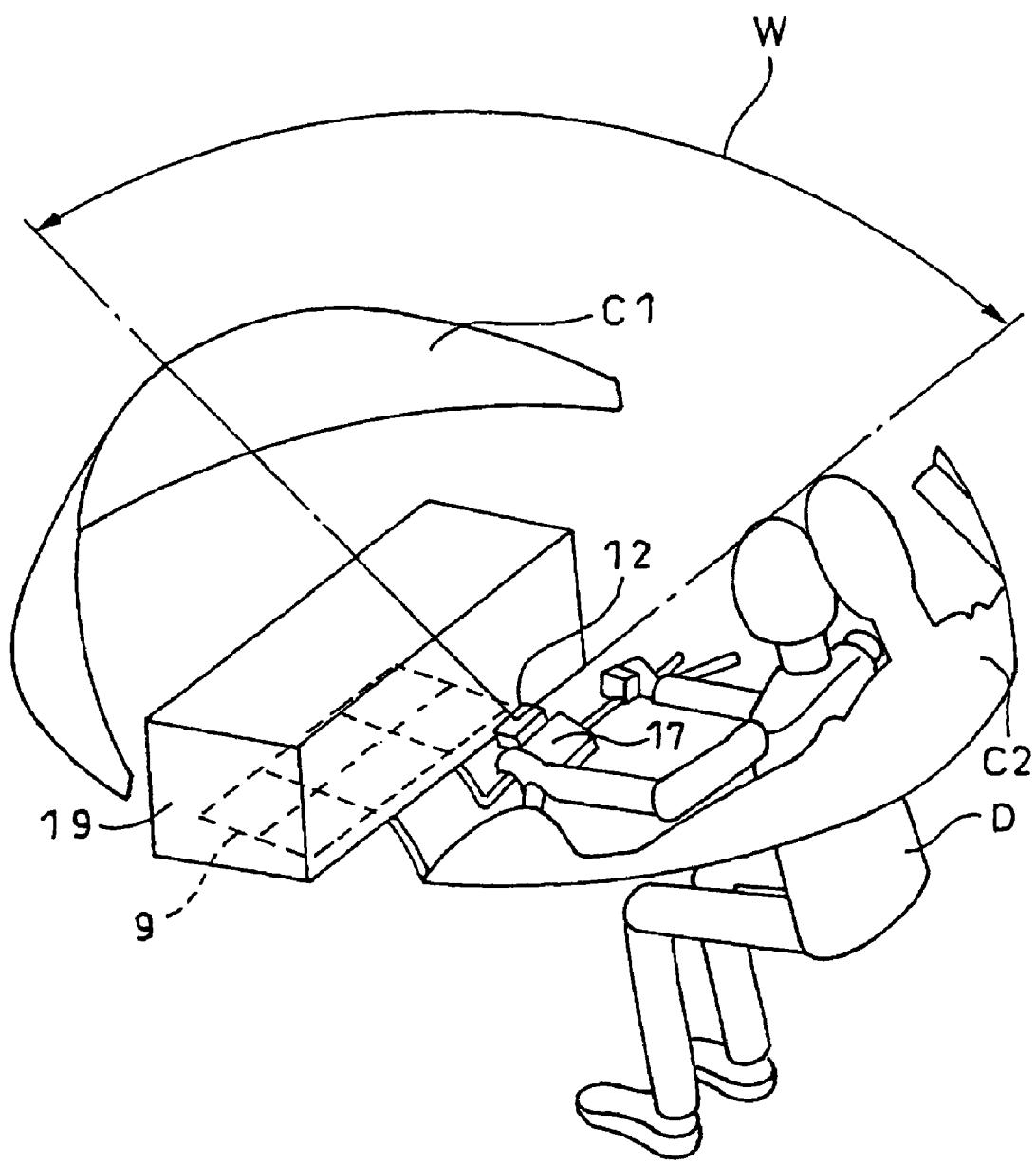
FIG. 3 is a diagram showing the receivable range of satellite radio waves.

FIG. 3 is a diagram showing the receivable range of satellite radio waves. FIG. 3 is based on the assumption that baggage 19 is placed on the front carrier 9. Ranges where satellite radio waves to be received by the GPS antenna 12 are cut off by the baggage 19 and the driver D are denoted by C1 and C2, respectively. Since the GPS antenna 12 is installed at a high position of ATV 1 as can be understood from FIG. 1, the ranges of satellite radio waves cut off by the baggage 19 and the driver can be narrowed, and the satellite radio waves can be received well at a wide angle range (W).

Since the GPS unit 18 including the GPS antenna 12 is installed adjacent to the indicator 17, harnesses for interconnecting the GPS unit 18 and the indicator 17 can be shortened.

Since the GPS unit 18 including the GPS antenna 12 is installed adjacent to the indicator 17, the GPS unit 18 and the indicator 17 can be covered with the same cover 13, thereby making it possible to prevent a complicated front section of the vehicle that results from an increase in the number of covers.

Since the indicator is installed at a high position in ATV 1 in most cases, high-sensitivity reception is possible with the GPS unit 18 installed at a high position by arranging the GPS unit 18 and the indicator 17 adjacent to each other without making other modifications.

The present invention can be particularly advantageously applied to a four-wheeled ATV. It can be also applied to a two-wheeled or three-wheeled saddle-type vehicle.

As obvious from the above description, according to the present invention, since the GPS antenna is installed at a relatively high position of the vehicle, satellite radio waves can be received at a wide range and navigation information can be obtained with high accuracy.

According to the present invention, diversity reception is made possible with high sensitivity by using two GPS antennas installed at high positions of the vehicle.

According to the present invention, even when baggage is placed on carriers installed at the front and rear of the vehicle, as the baggage does not become too high when a front view is taken into consideration, satellite radio waves can be received well by the GPS antenna installed at a relatively high position of the vehicle.

According to the present invention, since the GPS unit and the indicator are arranged in proximity to each other and are covered with the same cover, harnesses for interconnecting the GPS unit and the indicator can be shortened, the production becomes easy and the appearance of the vehicle becomes good.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ATV vehicle equipped with a navigation system for measuring its own location by receiving radio waves from an artificial satellite, comprising:
   a meter box including an indicator for indicating position information, the indicator disposed in a position that is substantially rearward and upward with respect to a central portion of a steering handle of the ATV vehicle;
   a GPS unit and a GPS antenna mounted inside the meter box, the GPS unit supplying position information to the indicator;
   a support member extending laterally and being disposed in a position forward and downward with respect to the central portion of the steering handle;
   a pair of L-shaped frames connected at forward ends thereof to opposite ends of the support member, and connected at rear ends thereof to an underside of the indicator, thereby mounting the meter box to the steering handle of the ATV vehicle.

2. The ATV vehicle equipped with a navigation system according to claim 1, and further including a pole extending upward from a fender covering wheels and a second GPS antenna mounted on top of the pole to enable diversity of reception with the GPS antenna and the GPS unit.

3. The ATV vehicle equipped with a navigation system according to claim 1, wherein the meter box and the GPS antenna turn during a turning operation of the steering handle.

4. The ATV vehicle equipped with a navigation system according to claim 1, further comprising a cover for covering the meter box.

5. The ATV vehicle equipped with a navigation system according to claim 1, further comprising a carrier for mounting baggage installed at a front and a rear portion of the vehicle which are lower than a position on the steering handle where the meter box enclosing the GPS antenna is mounted.

6. The ATV vehicle equipped with a navigation system according to claim 1, further comprising a cover for covering the meter box, the central portion of the steering handle, the L-shaped frames, and the support member.

7. The ATV vehicle equipped with a navigation system according to claim 1, wherein the GPS antenna is protected by the meter box.

8. A navigation system adapted to be used with a ATV vehicle for measuring a location of the ATV vehicle by receiving radio waves from an artificial satellite, comprising:
a meter box, the meter box including a GPS unit and a GPS antenna mounted inside the meter box, and an indicator for indicating position information supplied from the GPS unit the indicator disposed in a position that is substantially rearward and upward with respect to a central portion of a steering handle of the ATV vehicle;
a support member extending substantially parallel to and being connected to the central portion of the steering handle in a position forward and downward with respect the central portion of the steering handle;
a pair of frames connected at forward ends thereof to opposite ends of the support member, and connected at rear ends thereof to an underside of the indicator, thereby mounting the meter box to the steering handle of the ATV vehicle;
a cover extending downwardly over the central portion of the steering handle so as to cover a top side of the indicator, the central portion of the steering handle, the pair of frames, and the support member.

9. The navigation system according to claim 8, and further including a pole adapted to extend upwardly from a fender covering wheels and a second GPS antenna mounted on top of the pole to enable diversity of reception with the GPS antenna in the GPS unit.

10. The navigation system according to claim 8, wherein the meter box and the GPS antenna turn during a turning operation of the steering handle.

11. The navigation system according to claim 8, wherein the frames are L-shaped.

12. The navigation system according to claim 11, wherein the support member and the indicator are disposed on opposite sides of the central portion of the steering handle.

13. The navigation system according to claim 8, wherein the frames extend over the steering handle.

14. The navigation system according to claim 8, further comprising a carrier for mounting baggage adapted to be installed at a front and a rear portion of the vehicle which are lower than a position on the steering handle where the meter box enclosing the GPS antenna is mounted.

15. The navigation system according to claim 8, wherein the GPS antenna is protected by the meter box.

* * * * *